July 25, 1933.  S H H. KUENZEL  1,919,733
COWL VENTILATOR
Filed April 18, 1931

INVENTOR
S H Hunter Kuenzel
BY
Chappell Earl
ATTORNEYS

Patented July 25, 1933

1,919,733

UNITED STATES PATENT OFFICE

S H HUNTER KUENZEL, OF KALAMAZOO, MICHIGAN, ASSIGNOR TO CHECKER CAB MANUFACTURING CORPORATION, OF KALAMAZOO, MICHIGAN

COWL VENTILATOR

Application filed April 18, 1931. Serial No. 531,060.

The main object of this invention is to provide a cowl ventilator particularly for automotive vehicles which is efficient in operation and economical to manufacture.

Another object of the invention is to provide a cowl ventilator which will remain without rattling in either its open or closed position.

A still further object of my invention is to provide a gasket for a cowl ventilator which will not only always remain in place but one which will efficiently cooperate with the cover of the cowl ventilator to obviate rattling and one which will seal the ventilating opening in the cowl when the cover is closed.

Objects relating to details and economies of my invention will appear from the description to follow. The invention is defined and pointed out in the claims.

A structure which is a preferred embodiment of my invention is illustrated in the accompanying drawing, in which.

Figure 1:
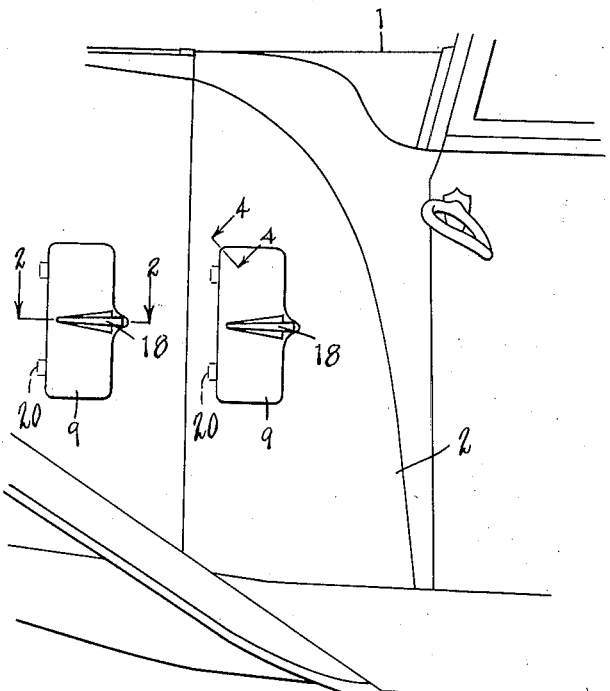
Fig. 1 is a view in side elevation of a portion of an automobile body having its cowl provided with ventilators constructed in accordance with my invention.
Figure 4:
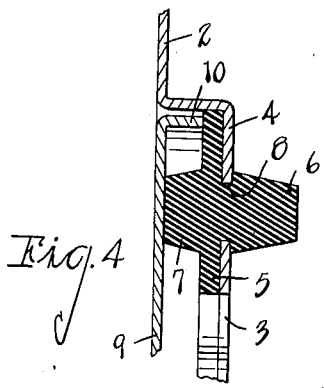
Fig. 4 is a detail sectional view taken on line 4—4 of Fig. 1 illustrating the cowl, gasket stud and cover combination.
Figure 3:
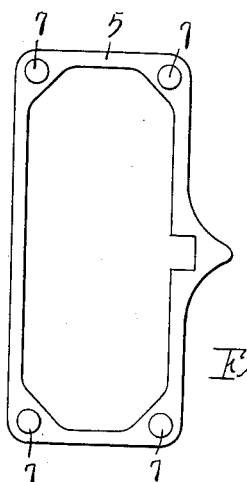
Fig. 3 is a view in side elevation of the rubber gasket.

Referring to the drawing, 1 designates an automobile body of a conventional type having a cowl 2. The cowl 2 is provided with a ventilating opening 3 which, in the embodiment illustrated, is of substantially rectangular shape. This shape may be changed as desired.

The opening 3 is formed in the bottom of a depression 4 in the cowl 2 which is adapted to seat a gasket 5 of rubber or rubber-like material. The gasket 5 is provided at its corners with oppositely extending studs 6 and 7. While I have shown four of these oppositely extending studs, it will be understood that any desirable number may be used.

Small stud receiving openings 8 are provided in the seat 4 of the cowl 2 which are slightly smaller in diameter than the base of the rearwardly extending studs 6 so that when the gasket is fitted over the seat 4 and the studs 6 are pressed home through the openings 8, the edge of the openings will engage and slip into recesses provided around the periphery of the base of the rearwardly extending studs 6. By this construction, the gasket 5 is held firmly in place in the seat 4 and there is no likelihood of its ever falling loose from the seat 4.

Figure 2:
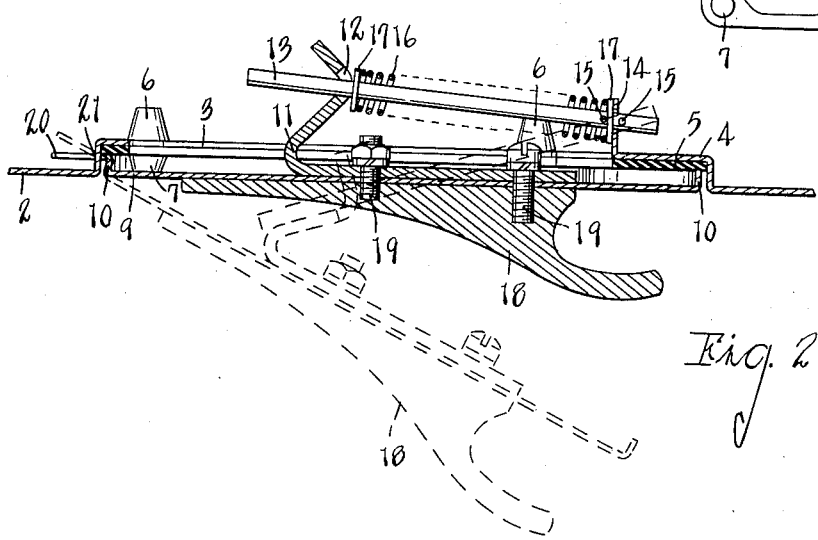
Fig. 2 is a cross sectional view of the cowl and ventilator taken on line 2—2 of Fig. 1.

The forwardly extending studs 7 of the gasket 5 are adapted to abut the inside of a cover 9 when the cover is in its closed position as shown in full lines by Fig. 2.

The cover 9 is preferably made of sheet metal having rearwardly extending flanged edges 10 for engaging the gasket 5 and for spacing the cover away from the seat 4 so that a smooth surface results between the outside of the cowl 2 and the outside of the cover 9.

Mounted on the back of the cover 9 and extending rearwardly therefrom is a bracket 11 which is provided with an opening 12 for the free passage of a rod 13 which extends therethrough. The rod 13 is loosely mounted in a rearwardly extending portion 14 of the cowl 2. The portion 14 of the cowl is bent backwardly as shown by Fig. 2 during the process of making the opening 3 in the cowl 2.

The rod 13 may be secured to the extension 14 in any suitable manner as for example by means of pins 15 which extend through the rod 13 on opposite sides of the extension 14. The opening in the extension 14 through which the rod 13 passes is made sufficiently large so that the rod 13 is free to rotate through an angle representing the open and closed positions of the cover 9. The open position of the cover 9 is indicated by dotted lines in Fig. 2.

A spring 16 is carried by the rod 13 between end washers 17 and is adapted to bias the bracket 11 in either its open or closed position.

A handle 18 is mounted on the front of the cover 9 by any suitable screws 19.

The base of the cover 18 is adapted to hide the ends of screws 19 which secure the bracket 11 to the back of the cover 9.

The cover is pivoted at one side of the depression 4 in the cowl by means of spaced extensions 20 extending from the pivoted side thereof through similarly spaced openings 21 which are provided in the side of the depression in the cowl forming the seat 2. The cover 9 is free to rotate in the openings 21 so that the cover may be readily opened and closed.

The closed position of the cover is limited by the gasket 5 and the open position of the cover is limited by the outer end of the rod 13 which is adapted to engage the rearwardly extending portion of the bracket 11 and prevent the further opening of the cover. As shown by the dotted lines, when the cover is in the open position the outer end of the rod 13 abuts against the rearwardly extending portion of the bracket 11 and is engaged inside of the opening 12 in the bracket 11 which cooperate to limit the further turning of the cover 9. Since the spring 16 is adapted to bias the bracket away from the mounted end of the rod, the cover is then held firmly and without the possibility of rattling in this open position. When the cover is closed, the spring 16 acts in a similar manner to bias the cover towards the gasket 5, thereby providing an efficient seal between the cowl and the cover. The rubber gasket also operates in this position of the cover to prevent rattling between the cowl and the cover.

I have illustrated and described my invention in an embodiment which has proved highly satisfactory. I have not attempted to illustrate and describe various modifications and adaptations as it is believed that this disclosure will enable those skilled in the art to embody or adapt my improvements as may be desired.

Having thus described my invention, what I claim as new and desire to secure by Letters Patent, is:

1. The combination with a vehicle cowl having a depression therein having a ventilating opening within said depression and a plurality of small gasket stud securing openings adjacent said ventilation opening, of a cover therefor comprising a sheet metal member having flanged edges extending rearwardly therefrom and spaced extensions on one side thereof, a handle mounted on the front of said cover, a rearwardly extending bracket mounted on the back of said cover having an opening therein, a rod pivotally mounted on the inside of said cowl and extending through said opening in said bracket, a spring mounted on said rod adapted to bias said bracket away from the pivoted end of said rod so as to hold the cover in either its closed or open position, the periphery of said depression in said cowl having spaced openings therein for accommodating the spaced extensions provided on the side of said cover whereby the cover may be turned about said openings, and a gasket of rubber-like material of substantially the shape of the edge of the cover having studs extending therefrom engaging the inside of the cover on one side when the cover is closed and the cowl depression on the other side at all times, the rearwardly projecting studs of said gasket being inserted in and retained by the edges of said gasket securing openings in the cowl.

2. The combination with a vehicle cowl having a depression therein having a ventilating opening within said depression and a plurality of small gasket stud securing openings surrounding said ventilating opening, of a cover therefor comprising a sheet material member having flanged edges extending rearwardly therefrom for engaging a gasket when closed and spaced extensions on one side thereof, a handle mounted on the front of said cover, a rearwardly extending bracket mounted on the back of said cover having an opening therein, a rearwardly extending member comprising a portion of said cowl, a rod pivotally mounted on said rearwardly extending member and extending through the opening in said bracket, a spring mounted on said rod adapted to bias said bracket away from said rearwardly extending member so as to hold the cover in either its closed or open positions, the periphery of said depression in said cowl having spaced openings in one side thereof for accommodating the extensions provided on the side of said cover whereby the cover may be turned in said spaced openings, and a rubber gasket of substantially the shape of the flanged edges of the cover seated in said cowl depression having studs extending therefrom for engaging the inside of the cover when closed and the periphery of the gasket stud securing openings in the cowl depression on the other side at all times.

3. The combination with a vehicle cowl having a ventilating opening and a plurality of small gasket stud securing openings surrounding said ventilating opening, of a cover therefor comprising a sheet metal member having a peripheral flange, a rearwardly extending bracket mounted on the back of said cover having an opening therein, a rod mounted on the inside of said cowl and extending through said opening in said bracket, a spring mounted on said rod adapted to bias said bracket away from the rod mounting whereby to hold the cover in either its closed or open positions, means whereby the cover may be turned about one side as a pivot between certain limits, and a rubber gasket of substantially the shape of the edge of the cover constituting a seat for the peripheral flange of said cover and having directly opposed studs extending therefrom for engaging the inside of the cover on one side and the gasket stud securing openings in the cowl on the other side.

4. A gasket for cowl ventilators and the like comprising a rubber-like material having spaced directly opposed integral studs thereon.

5. The combination with a gasket seat having holes therein, of a gasket of resilient material comprising a flat body portion disposed on and supported by said seat and having oppositely disposed integral studs thereon positioned with the studs on the inner side of the body portion engaged in said holes in said gasket seat, said studs at their bases exceeding in diameter the diameter of the holes and being in resilient locking engagment with the holes, and a closure member in supporting engagement with said studs when closed and having a flange at its edge coacting with the face of the gasket.

6. The combination with a gasket seat having holes therein, of a gasket of resilient material comprising a flat body portion disposed on and supported by said seat and having oppositely disposed integral studs thereon positioned with the studs on the inner side of the body portion engaged in said holes in said gasket seat under compression, said studs at their bases exceeding in diameter the diameter of the holes and a closure member in supporting engagement with said studs when closed.

7. The combination with a gasket seat having holes therein, of a gasket of resilient material comprising a body portion disposed on said seat and having integral closure supporting studs on the face thereof, and integral resilient studs on its inner side disposed opposite said closure supporting studs and engaged in said holes in said gasket seat, the diameter of said seat engaging studs at their bases exceeding the diameter of the holes in the seat, the studs being in resilient locking engagement with the holes.

8. The combination with a gasket seat having holes therein, of a gasket of resilient material comprising a body portion disposed on said seat and having integral closure supporting studs on the face thereof, and integral resilient studs on its inner side disposed opposite said closure supporting studs and engaged under compression in said holes in said gasket seat.

9. The combination with a vehicle cowl having a depression therein having a ventilating opening within said depression and a plurality of gasket stud securing openings surrounding said ventilating opening, of a cover therefor comprising a member having flanged edges extending rearwardly therefrom for engaging a gasket when closed and spaced extensions on one side thereof, a rearwardly extending bracket mounted on the back of said cover having an opening therein, a rearwardly extending member comprising a portion of said cowl, a rod pivotally mounted on said rearwardly extending member and extending through the opening in said bracket, a spring mounted on said rod adapted to bias said bracket away from said rearwardly extending member so as to hold the cover in either its closed or open positions, the periphery of said depression in said cowl having spaced openings in one side thereof for accommodating the extensions provided on the side of said cover whereby the cover may be turned in said spaced openings, and a gasket of substantially the shape of the flanged edges of the cover seated in said cowl depression having studs extending therefrom for engaging the inside of the cover when closed and the periphery of the gasket stud securing openings in the cowl depression on the other side at all times.

10. A cowl ventilator comprising a cover having a peripheral flange for cooperation with a rubber gasket and studs for extending through openings in the cowl adapted to receive them, a cowl having a ventilating opening surrounded by a flange providing a seat for said cover, said flange having stud receiving openings, a rubber gasket secured to said seat having studs engaging the edges surrounding the stud receiving openings in the flange of the cowl, a rearwardly extending bracket mounted on the back of said cover having an opening for the free passage of a rod, a rod mounted on said cowl and extending through said opening, a spring carried by said rod biasing said bracket away from the cowl rod support, and a handle carried by said cover for the opening and closing thereof.

11. The combination with a cowl ventilator comprising a member having an opening surrounded by a seat provided with stud receiving openings and a cover having a peripheral flange, of a rubber gasket therefor comprising a sheet of rubber having the shape of the seat of the ventilating opening for seating the peripheral flange of the cover and being provided with spaced studs on one side for engaging stud receiving openings in the ventilating seat to thereby retain the gasket securely in place, and spaced studs on the other side directly opposite said first named studs for abutting the inside of the ventilator cover.

S H HUNTER KUENZEL.